United States Patent
Mak

(10) Patent No.: US 9,491,363 B2
(45) Date of Patent: Nov. 8, 2016

(54) AUTOMATIC TUNING METHOD AND SYSTEM FOR OPTICAL IMAGE STABILIZATION CAMERA MODULES

(71) Applicant: AP PHOTONICS (SHEN ZHEN) LIMITED, Shenzhen (CN)

(72) Inventor: Lin Chi Mak, Shenzhen (CN)

(73) Assignee: AP PHOTONICS (SHEN ZHEN) LIMITED, Shenzhen (CN)

( * ) Notice: Subject to any disclaimer, the term of this patent is extended or adjusted under 35 U.S.C. 154(b) by 0 days.

(21) Appl. No.: 14/670,002

(22) Filed: Mar. 26, 2015

(65) Prior Publication Data

US 2015/0201129 A1 Jul. 16, 2015

Related U.S. Application Data

(63) Continuation of application No. PCT/CN2013/079620, filed on Jul. 18, 2013.

(30) Foreign Application Priority Data

Sep. 26, 2012 (CN) .......................... 2012 1 0363514

(51) Int. Cl.
*H04N 5/232* (2006.01)
*H04N 17/00* (2006.01)
*G03B 43/00* (2006.01)
*G03B 5/00* (2006.01)
*H04N 5/225* (2006.01)

(52) U.S. Cl.
CPC ............ *H04N 5/23287* (2013.01); *G03B 5/00* (2013.01); *G03B 43/00* (2013.01); *H04N 17/002* (2013.01); *G03B 2205/0007* (2013.01); *G03B 2217/005* (2013.01); *H04N 5/2257* (2013.01); *H04N 5/23267* (2013.01)

(58) Field of Classification Search
CPC .............. G06T 7/0018; H04N 17/002; H04N 1/00026–1/00047; H04N 1/00082–1/00087; H04N 5/23248; H04N 5/23261–5/23287; G03B 43/00; G03B 2205/0007–2205/0038; G02B 27/64; G02B 27/646
See application file for complete search history.

(56) References Cited

U.S. PATENT DOCUMENTS

| | | | |
|---|---|---|---|
| 2009/0237517 A1 | 9/2009 | Lam et al. | |
| 2010/0014846 A1* | 1/2010 | Nishi | G03B 5/00 396/52 |
| 2012/0307089 A1* | 12/2012 | Rukes | H04N 5/232 348/208.99 |
| 2014/0320678 A1* | 10/2014 | Lee | G02B 27/646 348/208.1 |

FOREIGN PATENT DOCUMENTS

| | | |
|---|---|---|
| CN | 101251706 | 8/2008 |
| CN | 101682697 | 3/2010 |
| CN | 201438257 | 4/2010 |
| CN | 101923267 | 12/2010 |
| CN | 101923267 | 7/2012 |

OTHER PUBLICATIONS

International Search Report for international application No. PCT/CN2013/079620, dated Oct. 31, 2013 (3 pages).

* cited by examiner

Primary Examiner — Paul Berardesca
(74) Attorney, Agent, or Firm — Hamre, Schumann, Mueller & Larson, P.C.

(57) ABSTRACT

An automatic tuning method for an OIS camera module, comprising the steps of: S0, providing an automatic tuning platform (1), and enabling an OIS camera module (2) to directly face an objective plane (103); S1, a control module (101) indicating to an OIS motor controller (201) to control an OIS motor (203), thereby changing the stroke of a lens; S2, changing control parameters of each driver or each pair of drivers in sequence, and recording the control parameters, compensation angles and a relative angle each time the control parameters of one or one pair of drivers are changed; S3, according to the control parameters, the compensation angles and the relative angle, the control module (101) calculating an OIS gain in each stroke; and S4, transmitting the OIS gain in each stroke to the OIS motor controller (201).

20 Claims, 3 Drawing Sheets

AUTOMATIC TUNING METHOD AND SYSTEM FOR OPTICAL IMAGE STABILIZATION CAMERA MODULES

FIELD OF THE INVENTION

The present application relates to optical image stabilization (OIS) cameras, and more particularly relates to an automatic tuning method and system for OIS camera modules. The method and the system can be used in small mobile devices, such as mobile phones and notebook computers.

BACKGROUND OF THE INVENTION

Nowadays, the OIS technology of digital cameras and lenses has already been mature and popular, and the users have already fully understood the advantages of the OIS technology. When taking photos in some specific situations, such as in a low-light environment, the shake of hands affects the photo qualities very significantly, and may cause photos to be blurry. The OIS technology can effectively reduce the influence of the shake on the photos.

With the more and more extensive applications of miniature camera modules in mobile phones, the resolutions of the modules become higher and higher; in some specific situations, the shake of hands affects the photo qualities very significantly too. Although the users can solve the problem by increasing the light sensitivity, the area of the photosensitive element of each miniature camera module is highly limited; therefore, when a miniature camera module takes photos under a high light sensitivity, there will be much image noise, and the quality of the photos can be adversely affected.

Therefore, the industry has already actively researched and manufactured various OIS technologies for miniature camera modules. Some OIS technologies (for example, US Published Patent Application 20090237517 and CN Patent 200810090504.1) do not need accurate and reliable lens position sensors, and thus the volumes, complexities, and power consumption of camera modules can be reduced.

However, in the mass production of OIS motors, the characteristics of each OIS motor may be slightly different from the design characteristics due to the effect of errors generated in production, which may cause deviations of the relationship between control parameters and compensation angles. Therefore, in order to enable a camera module to achieve the best OIS effect in the absence of an accurate and reliable lens position sensor, each camera module requires tuning so as to find the relationship between its control parameters and its compensation angles. Wherein, the values of the compensation angles are equal to the values of the vibration angles, but the direction of the compensation angles are opposite to the directions of the vibration angles.

Since there is no widely used automatic tuning method at present, in the prior art, an OIS camera module may need to be manually tuned so as to find the relationship between the compensation angles of its angular vibrations and its control parameters. Since the relationship between the compensation angles and the control parameters varies with the focusing distance and the lens stroke, the relationship should be determined at several different focusing distances, and the objective needs to be placed at different distances. Therefore, the required time will be very long if the whole tuning process is manually performed by manpower. In mass production, too much manpower resource may be required, and the operating cost may be too high.

Furthermore, since existing tuning technologies require manual operations, their accuracies are limited by the skill of the operators. Therefore, it is very important to train and manage the operators, and the training and managing work may further increase the operating cost. Since each operator needs a set of tuning appliance and adequate space, and the existing technologies require many operators, these technologies require much setup cost, which comprises the cost of having large working space and the cost of arranging many appliances. Since the existing technologies require many operators, when the producing output needs to increase, recruiting the workers and increasing the area of the factory may take a long time, which limits the speed of increasing the output. Additionally, the reliability of tuning is also limited by the skill of the operators. Since the operators may be required to highly concentrate on the tuning process, it is very difficult to request an operator to keep high consistency, accuracy, and reliability for a long time.

SUMMARY OF THE INVENTION

The technical problem to be solved by the present application is to provide an automatic tuning method and system for OIS camera modules which require low manpower cost and achieve high reliability, aiming at the drawbacks in the prior art.

The present application solves the above technical problem by adopting the following technical solution: an automatic tuning method for OIS camera modules is provided; wherein, the method is used to tune an OIS camera module, the OIS camera module comprises an OIS motor controller and an OIS motor including a lens, and the OIS motor further includes a plurality of drivers; the method comprises the following steps:

S0: providing an automatic tuning platform, and providing an objective plane and a control module on the automatic tuning platform, wherein an image is preset on the objective plane; mounting the OIS camera module on the automatic tuning platform, and connecting the OIS motor controller with the control module; making an optical axis of the OIS camera module be perpendicular to the objective plane, and using an intersection of the objective plane and the optical axis as an origin to establish a space coordinate system, where in the space coordinate system includes an X-axis and a Y-axis which are defined in the objective plane and perpendicular to each other, and a Z-axis which is perpendicular to the objective plane;

S1: using the control module to instruct the OIS motor controller to control the OIS motor, and thereby changing the stroke of the lens, so that the stroke of the lens is a difference value between a current distance from the lens to the image and the least distance from the lens to the image;

S2: using the control module to change control parameters of each driver or each pair of drivers in sequence, and thereby moving the lens; after every time the control parameters of one driver or a pair of drivers are changed, using the control module to record compensation angles, a relative angle, and the control parameters, wherein the relative angle is an included angle between a connecting line from the lens to the image and the Z-axis;

S3: transmitting the recorded control parameters, compensation angles, and relative angle to the control module, and using the control module to calculate an OIS gain in the stroke according to the control parameters, the compensation angles, and the relative angle;

S4: transmitting the OIS gains to the OIS motor controller.

In the automatic tuning method for OIS camera modules of the present application, the step S1 includes the following sub-steps:

S101: using the control module to preset the number $n_i$ of the times for changing the stroke, and using the OIS motor controller to preset i=1;

S102: using the control module to instruct the OIS motor controller to control the OIS motor, and thereby changing the stroke of the lens; at this time, the stroke is $s_i$;

the step S3 includes the following sub-steps:

S301: using the control module to calculate an OIS gain in the stroke $s_i$ according to the control parameters, the compensation angles, and the relative angle;

S302: determining whether i is equal to $n_i$; if yes, performing the step S4; if no, adding 1 to i, and returning to the sub-step S102.

In the automatic tuning method for OIS camera modules of the present application, in the step S0, at least two images are preset on the objective plane, each of the images is a solid point having at least two symmetry axes, and at least one pair of the symmetry axes form an included angle of 90 degrees;

in the step S1, a centroid of an image is used as an objective position of the image, and the objective position is used as a reference position of the stroke. In the automatic tuning method for OIS camera modules of the present application, the control parameters are recorded as v, $v=[v_1, \ldots, v_{n_j}]$, wherein $n_j$ is the number of the drivers; when the stroke is $s_i$, the relationship among the OIS gain, the compensation angles, and the control parameters are $v=K(\theta, s_i)$, wherein K is the OIS gain, and θ is the compensation angles; $\theta=[\theta_x, \theta_y]$, wherein $\theta_x$ is a compensation angle in the direction of $R_x$, and $\theta_y$ is a compensation angle in the direction of $R_y$.

In the automatic tuning method for OIS camera modules of the present application, if there are $n_q$ images on the objective plane, and in the photos obtained by an image sensor, the centroid of the $q^{th}$ image is $x_q=[x_q, y_q]$ q∈[1, $n_q$]∈N, wherein the measurement unit of $x_q$ and $y_q$ is pixel, and the average centroid is $\bar{x}_q=\Sigma x_q/n_q$, the step S3 further comprises: calculating the relationship between the image and the relative angle:

$$g = \frac{\Sigma \beta_q}{\Sigma \|\bar{x}_q - x_q\|},$$

wherein $\beta_q$ is the relative angle; and calculating the compensation angle θ according to the change $\Delta\bar{x}$ of $\bar{x}$: $\theta=g\Delta\bar{x}$.

In the automatic tuning method for OIS camera modules of the present application, the step S0 further comprises providing a storage module in the automatic tuning platform; and in the step S0, the control module reads tuning parameters stored in the storage module.

In the automatic tuning method for OIS camera modules of the present application, the tuning parameters include the waiting time t after every time the OIS motor moves, the number $n_j$ of the drivers, the number $n_i$ of strokes during tuning, all the values $s_i$ of $i^{th}$ stroke during tuning, i∈[1, $n_i$]∈N, and the control parameters.

In the automatic tuning method for OIS camera modules of the present application, the step S4 further comprises storing the OIS gains in the storage module.

In the automatic tuning method for OIS camera modules of the present application, the control parameters include the voltages or the current of the drivers.

In the automatic tuning method for OIS camera modules of the present application, in the step S0, the objective plane is vertical, and in the space coordinate system, the X-axis is horizontal and the Y-axis is vertical.

The present application further provides an automatic tuning system for OIS camera modules; wherein, the system is used to tune an OIS camera module, the OIS camera module comprises an OIS motor controller and an OIS motor including a lens, and the OIS motor further includes a plurality of drivers; the system comprises an automatic tuning platform, an objective plane and a control module are provided on the automatic tuning platform, and an image is preset on the objective plane; the OIS camera module is mounted on the automatic tuning platform, and the OIS motor controller is connected with the control module; an optical axis of the OIS camera module is perpendicular to the objective plane, and the automatic tuning platform uses an intersection of the objective plane and the optical axis as an origin to establish a space coordinate system; the space coordinate system includes an X-axis and a Y-axis which are defined in the objective plane and perpendicular to each other, and a Z-axis which is perpendicular to the objective plane;

the control module is configured to instruct the OIS motor controller to control the OIS motor and thereby change the stroke of the lens, and the stroke is a difference value between a current distance from the lens to the image and the least distance from the lens to the image;

the control module is further configured to: change control parameters of each driver or each pair of drivers in sequence and thereby move the lens; record compensation angles, a relative angle, and the control parameters after every time the control parameters of one driver or a pair of drivers are changed; calculate an OIS gain in the stroke according to the recorded control parameters, compensation angles, and relative angle; and transmit the OIS gain to the OIS motor controller; wherein, the relative angle is an included angle between a connecting line from the lens to the image and the Z-axis.

In the automatic tuning system for OIS camera modules of the present application, the OIS motor controller is further configured to preset i=1; the control module is further configured to preset the number $n_i$ of the times for changing the stroke, and instruct the OIS motor controller to control the OIS motor and thereby change the stroke of the lens, wherein the stroke is $s_i$;

the control module is further configured to: calculate an OIS gain in the stroke $s_i$, and determine whether i is equal to $n_i$, if yes, transmit the OIS gain to the OIS motor controller; if no, add 1 to i and change the stroke of the lens again.

In the automatic tuning system for OIS camera modules of the present application, at least two images are preset on the objective plane, each of the images is a solid point having at least two symmetry axes, and at least one pair of the symmetry axes form an included angle of 90 degrees;

the control module is further configured to use a centroid of an image as an objective position of the image, and use the objective position as a reference position of the stroke.

In the automatic tuning system for OIS camera modules of the present application, the control parameters are recorded as v, $v=[v_1, \ldots, v_{n_j}]$, wherein $n_j$ is the number of the drivers; when the stroke is $s_i$, the relationship among the OIS gain, the compensation angles, and the control parameters are $v=K(\theta, s_i)$, wherein K is the OIS gain, and θ is the compensation angle; $\theta=[\theta_x, \theta_y]$, wherein $\theta_x$ is a compensation angle in the direction of $R_x$, and $\theta_y$ is a compensation angle in the direction of $R_y$.

In the automatic tuning system for OIS camera modules of the present application, if there are $n_q$ images on the objective plane, and in the photos obtained by an image sensor, the centroid of the $q^{th}$ image is $x_q=[x_q, y_q]$, $q\in[1, n_q]\in N$, wherein the measurement unit of $x_q$ and $y_q$ is pixel, and the average centroid is $\bar{x}_q=\Sigma x_q/n_q$, the control module is further configured to: calculate the relationship between the image and the relative angle:

$$g = \frac{\Sigma \beta_q}{\Sigma \|\bar{x}_q - x_q\|},$$

and calculate the compensation angles $\theta$ according to the change $\Delta \bar{x}$ of $\bar{x}$: $\theta=g\Delta\bar{x}$; wherein $\beta_q$ is the relative angle.

In the automatic tuning system for OIS camera modules of the present application, the OIS camera module further comprises an image sensor configured to obtain photos via the lens, and the automatic tuning platform is provided therein with an image format conversion module configured to convert the format of the photos obtained by the image sensor and transmit the converted photos to the control module, and a storage module configured to store tuning parameters;

the control module is further configured to read the tuning parameters stored in the storage module, and record the compensation angles, the relative angle, and the control parameters according to the photos in the converted format.

In the automatic tuning system for OIS camera modules of the present application, the tuning parameters include the waiting time t after every time the OIS motor moves, the number $n_j$ of the drivers, the number $n_i$ of strokes during tuning, all the values $s_i$ of $i^{th}$ stroke during tuning, $i\in[1, n_i]\in N$, and the control parameters.

In the automatic tuning system for OIS camera modules of the present application, the control module is further configured to store the OIS gain in the storage module.

In the automatic tuning system for OIS camera modules of the present application, the control parameters include the voltages or the current of the drivers.

In the automatic tuning system for OIS camera modules of the present application, the objective plane is vertical, and in the space coordinate system, the X-axis is horizontal and the Y-axis is vertical.

The automatic tuning method and system for OIS camera modules of the present application have the following advantageous effects: automatic tuning can be achieved in the absence of manual intervention; in this way, not only is the consumption of manpower and material resources reduced, but also errors of manual tuning do not need to be considered because of the entire electronic tuning process, and thus the reliability and consistency of tuning are improved. Even though the errors generated in production may cause differences of the characteristics of the OIS motors, the OIS motor controller can find the relationship between the compensation angles and the OIS control parameters in different strokes according to the OIS gain, and correct the effect of the errors. On the other hand, a camera module tuned by the method of the present application does not require any lens position sensor, and thus the production cost can be further reduced.

BRIEF DESCRIPTION OF THE DRAWINGS

The present application will be further described hereafter with reference to the accompany drawings and embodiments. In the drawings.

DETAILED DESCRIPTION OF THE PREFERRED EMBODIMENT

In order to make the objectives, technical solutions, and advantages of the present application be clearer, the present application will be further described hereafter with reference to the accompany drawings and embodiments. It should be understood that the embodiments described herein are only intended to illustrate but not to limit the present application.

Figure 1:
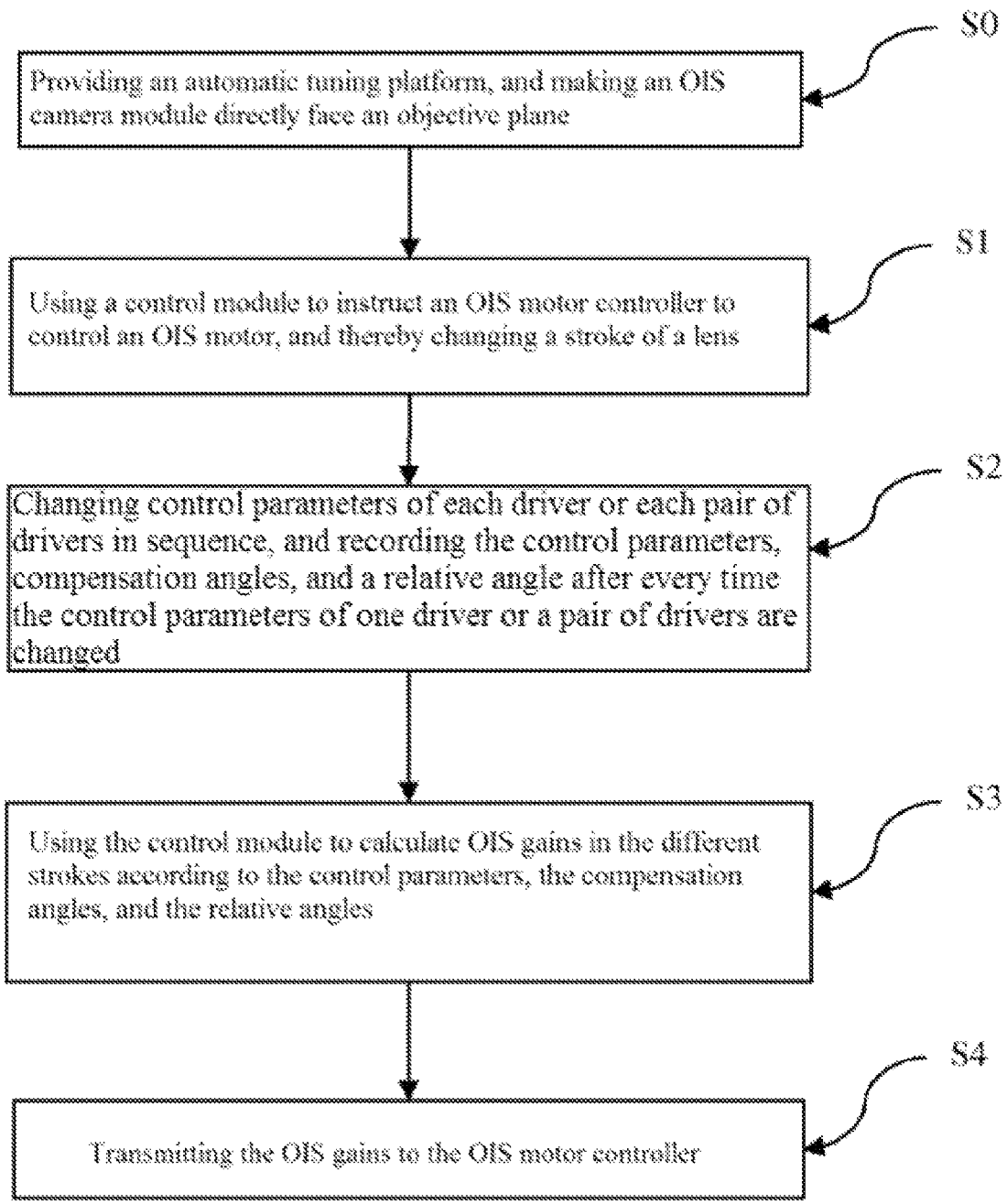
FIG. 1 is a flow chart of an automatic tuning method for OIS camera modules of the present application.
Figure 3:
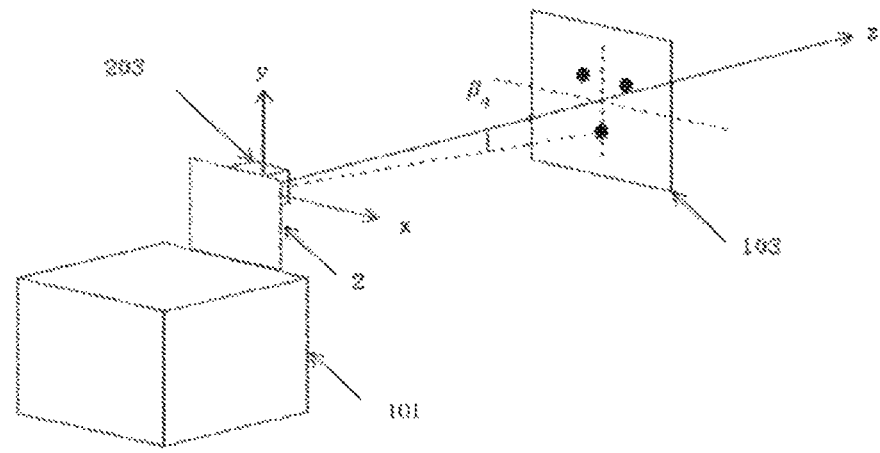
FIG. 3 is a schematic view of the position relationship between an OIS camera module and an objective plane.
Figure 4:
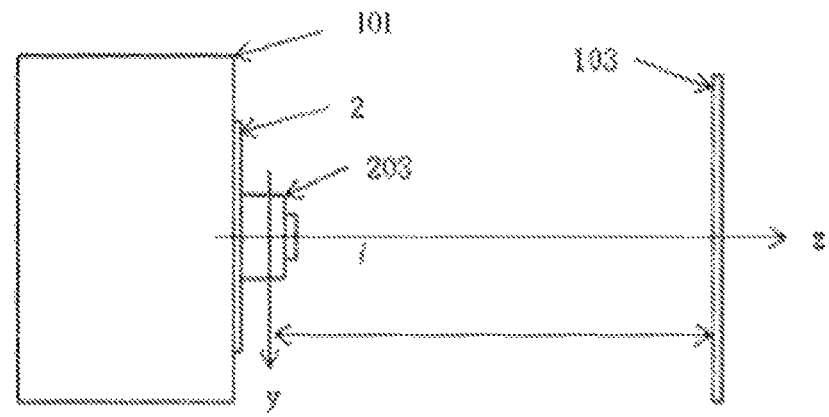
FIG. 4 is a vertical view of FIG. 3.

FIG. 1 shows an automatic tuning method for OIS camera modules, wherein the method comprises the following steps:

S0: providing an automatic tuning platform 1, and providing an objective plane 103, a control module 101, and an image format conversion module 102, wherein a pattern is on the objective plane 103; as shown in FIG. 3 and FIG. 4, an OIS camera module 2 is arranged to face the objective plane 103, at this time, an optical axis of the OIS camera module 2 is perpendicular to the objective plane 103; using a point of the objective plane 103 which is aligned with the OIS camera module 2 as an origin, and thereby establishing a space coordinate system, wherein the space coordinate system includes an X-axis and a Y-axis which are defined in the objective plane 103 and perpendicular to each other, and a Z-axis which is perpendicular to the objective plane 103. The purpose of establishing the coordinate system on the objective plane 103 is to indicate the position of the image, furthermore, when one camera module has been tuned, another camera module can be then fixed at the same position to be tuned. A preferred arrangement method is to arrange the objective plane 103 vertically, in this situation, the X-axis is horizontal and the Y-axis is vertical.

Figure 2:
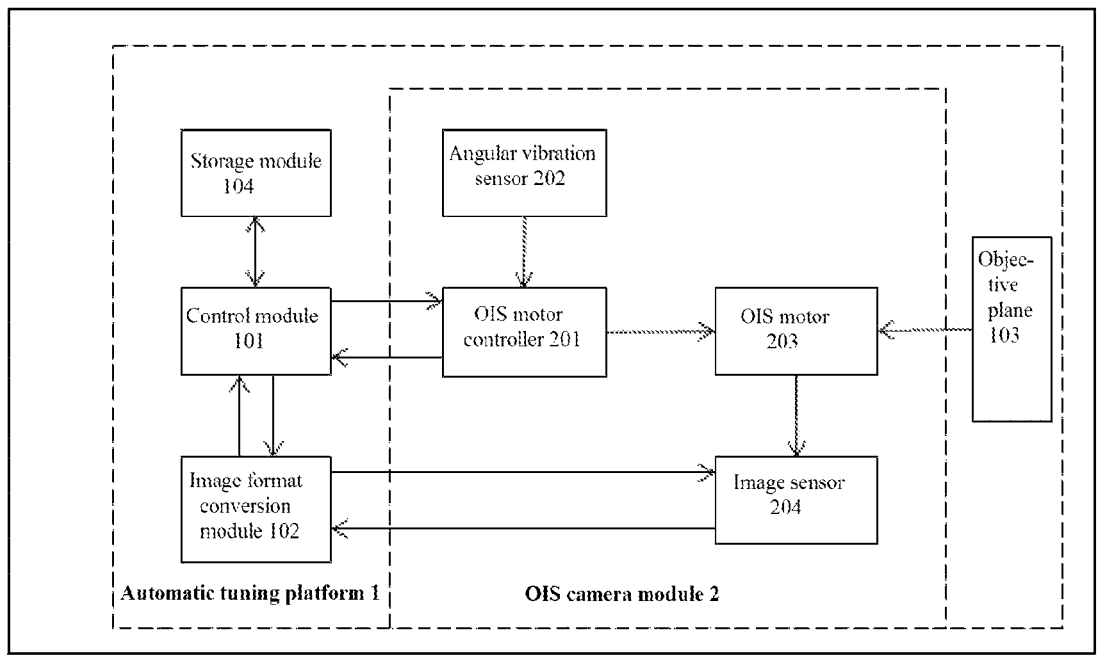
FIG. 2 is a block diagram of an automatic tuning system for OIS camera modules of the present application.

As shown in FIG. 2, the OIS camera module 2 includes an OIS motor controller 201, an angular vibration sensor 202, an OIS motor 203, and an image sensor 204; the OIS motor 203 is provided with a lens, and the OIS motor 203 includes a plurality of drivers; the OIS motor controller 201 is connected with the control module 101, and the image sensor 204 is connected with the image format conversion module 102; in this way, the control module 101 can control the OIS motor 203 via the OIS motor controller 201, and the image format conversion module 102 can obtain image files from the image sensor 204, convert the formats of the image files, and transmit converted image files to the control module 101 to analyze.

S1: using the control module 101 to instruct the OIS motor controller 201 to control the OIS motor 203, and thereby changing the stroke of the lens, so that the stroke of the lens is a difference value between a current distance from the lens to the image and the least distance from the lens to the image;

S2: using the control module 101 to change control parameters of each driver or each pair of drivers in sequence, and thereby moving the lens; after every time the control parameters of one driver or a pair of drivers are changed, using the control module 101 to record compensation angles, a relative angle, and the control parameters, wherein the relative angle is an included angle between a connecting line from the lens to the image and the Z-axis; in the present application, the lens of the OIS motor 203 can provide not only an OIS effect but also an automatic focusing function. Therefore, the OIS motor 203 includes at least three drivers, and has at least three degrees of freedom.

Each of the above-mentioned drivers can be: A, a combination of a magnet and a coil; B, a piezoelectric component; or C: an electroactive polymer component. By changing electric signals applied to the drivers, the movements of the drivers can be changed, the direction or position of the lens can be correspondingly changed, and thus an automatic focusing function or an OIS function can be achieved. OIS motors can be divided into two categories: linear OIS motors and tilt-type OIS motors. Both the two categories can be rapidly and automatically tuned by the method of the present application.

S3: transmitting the recorded control parameters, compensation angles, and relative angle to the control module 101, and using the control module 101 to calculate an OIS gain in the stroke according to the control parameters, the compensation angles, and the relative angle;

S4: transmitting the OIS gain to the OIS motor controller 201. In this way, during an actual working process of the product, the OIS motor controller 201 can regulate the motor control according to the OIS gain, and thus OIS can be effectively performed.

In this tuning method of the present application, automatic tuning can be achieved in the absence of manual intervention; in this way, not only is the consumption of manpower and material resources reduced, but also errors of manual tuning do not need to be considered because of the entire electronic tuning process, and thus the reliability and consistency of tuning are improved. Even though the errors generated in production may cause differences of the characteristics of the OIS motors 203, the OIS motor controller 201 can find the relationship between the compensation angles and the OIS control parameters in different strokes according to the OIS gain, and correct the effect of the errors. On the other hand, a camera module tuned by the method of the present application does not require any lens position sensor, and thus the production cost can be further reduced.

Since different optimal OIS gains corresponding to different strokes need to be found in actual tuning, for repeatedly performing many times of tuning, the step S1 specifically includes the following sub-steps:

S101: using the control module 101 to preset the number $n_i$ of the times for changing the stroke, and using the OIS motor controller 201 to preset i=1;

S102: using the control module 101 to instruct the OIS motor controller 201 to control the OIS motor 203, and thereby changing the stroke of the lens; at this time, the stroke is $s_i$;

the step S3 specifically includes the following sub-steps:

S301: using the control module 101 to calculate an OIS gain in the stroke $s_i$ according to the control parameters, the compensation angles, and the relative angle;

S302: determining whether i is equal to $n_i$; if yes, performing the step S4; if no, adding 1 to i, and returning to the sub-step S102. That is, if i is not equal to $n_i$, it can be inferred that i is necessarily less than $n_i$, the lens has not finished all preset strokes now, and tuning needs to be continued; when i is changed to different values, the operations of the step S2 are not changed, only the obtained parameters are different.

Figure 5:
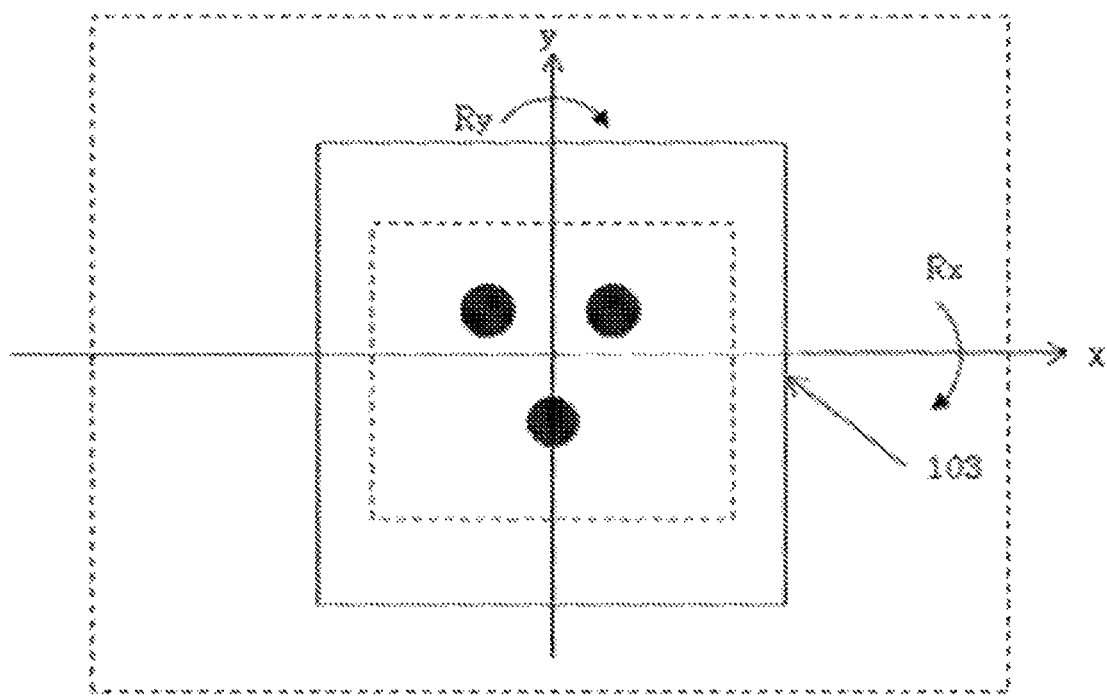
FIG. 5 is a schematic view of the objective plane.

As shown in FIG. 5, in the step S0, at least two images are preset on the objective plane 103, each of the images is a solid point having at least two symmetry axes, and at least one pair of the symmetry axes form an included angle of 90 degrees. Wherein, points meeting the above-mentioned conditions include circular points and square points. In the step S1, a centroid of an image is used as an objective position of the image, and the objective position is used as a reference position of the stroke. In FIG. 5, the three black solid points are three images.

The reason for selecting the points meeting the above-mentioned conditions is that: when the stroke of the lens is changed in the step S1, the distance between the lens and the images is changed, and an out-of-focus situation may occur at this time; in the out-of-focus situation, the images become more blurred, if an image is in an irregular shape, the position of a centroid of the image relative to the image may vary; however, if an image meets the above-mentioned conditions, its centroid can still be accurately and reliably found. Therefore, irregular images are not recommended to use in the present application.

In the present application, only the stroke is changed during the tuning process, and the distance of the objective plane module is not changed; therefore, the tuning speed can be increased, and time can be saved.

The OIS control parameters are recorded as v, and is used to represent the control for each driver; $v=[v_1, \ldots, v_{n_j}]$. Wherein, $n_j$ is the number of the drivers; when the stroke is $s_i$, the relationship among the OIS gain, the compensation angles, and the control parameters are $v=K(\theta, s_i)$, wherein K is the OIS gain, and $\theta$ is the compensation angles; $\theta=[\theta_x, \theta_y]$, wherein $\theta_x$ is a compensation angle in the direction of $R_x$, and $\theta_y$ is a compensation angle in the direction of $R_y$. Wherein, the control parameters can be the voltage or current of each driver, and can also be other possible parameters. During tuning, the OIS gains are calculated according to the measured control parameters; in the actual work, the corresponding control parameters can be obtained according to the OIS gains, which are reliable and accurate.

Furthermore, if there are $n_q$ images on the objective plane 103, and in the photos obtained by the image sensor 204, the centroid of the $q^{th}$ image is $x_q=[x_q, y_q]$, $q\in[1, n_q]\in N$, wherein the measurement unit of $x_q$ and $y_q$ is pixel, and the average centroid is $\bar{x}_q=\Sigma x_q/n_q$, the step S3 further comprises: calculating the relationship between the position of the image and the relative angle:

$$g = \frac{\Sigma \beta_q}{\Sigma \|\bar{x}_q - x_q\|},$$

wherein $\beta_q$ is the relative angle; and calculating the compensation angles $\theta$ according to the change $\Delta \bar{x}$ of $\bar{x}$: $\theta=g\Delta\bar{x}$. In this way, on the premise that the objective plane module is not moved, the relationship between the position of the image and the relative angle can be obtained, and the compensation angles can be calculated according to this relationship and the change of the position of the average centroid; additionally, as long as the coordinates of an image are obtained, the distance between the image and the lens can be immediately obtained, and thus the stroke of the lens can be rapidly calculated in the actual work.

Since the relationship between the position of the image and the relative angle is based on an assumption that $\beta_q$ is an adequately small angle, that is, $\beta_q \approx \sin(\beta_q) \approx \tan(\beta_q)$, $\beta_q$ should not be too large relative to the whole image; generally, $\beta_q$ should not be larger than 10 degrees.

Moreover, the step S0 further comprises providing a storage module 104 in the automatic tuning platform 1; and in the step S0, the control module 101 reads tuning parameters stored in the storage module 104 to control the OIS camera module 2 using the tuning parameters during tuning. Wherein, the tuning parameters include the waiting time t after every time the OIS motor 203 moves, the number $n_j$ of the drivers, the number $n_t$ of strokes during tuning, all the values $s_i$ of $i^{th}$ stroke during tuning, $i \in [1, n_t] \in N$, and the control parameters.

Furthermore, the step S4 further comprises storing the OIS gains in the storage module 104.

FIG. 2 shows an automatic tuning system for OIS camera modules, and the system can be used in the above-mentioned method to tune the OIS camera module 2. The OIS camera module 2 comprises an OIS motor controller 201 and an OIS motor 203 including a lens, and the OIS motor 203 further includes a plurality of drivers; the system comprises an automatic tuning platform 1, an objective plane 103 and a control module 101 are provided on the automatic tuning platform 1, and an image is preset on the objective plane 103; the OIS camera module 2 is mounted on the automatic tuning platform 1, and the OIS motor controller 201 is connected with the control module 101; an optical axis of the OIS camera module 2 is perpendicular to the objective plane 103, and the automatic tuning platform 1 uses an intersection of the objective plane 103 and the optical axis as an origin to establish a space coordinate system; the space coordinate system includes an X-axis and a Y-axis which are defined in the objective plane 103 and perpendicular to each other, and a Z-axis which is perpendicular to the objective plane 103.

The control module 101 is configured to instruct the OIS motor controller 201 to control the OIS motor 203, and thereby changes the stroke of the lens, so that the stroke of the lens is a difference value between a current distance from the lens to the image and the least distance from the lens to the image.

The control module 101 is further configured to: change control parameters of each driver or each pair of drivers in sequence and thereby move the lens; record compensation angles, a relative angle, and the control parameters after every time the control parameter of one driver or a pair of drivers are changed; calculate an OIS gain in the stroke according to the recorded control parameters, compensation angles, and relative angle; and transmit the OIS gain to the OIS motor controller 201; wherein, the relative angle is an included angle between a connecting line from the lens to the image and the Z-axis.

Furthermore, the OIS motor controller 201 is further configured to preset i=1; the control module 101 is further configured to preset the number $n_t$ of the times for changing the stroke, and instruct the OIS motor controller 201 to control the OIS motor 101 and thereby change the stroke of the lens, wherein the stroke is $s_i$.

The control module 101 is further configured to: calculate an OIS gain in the stroke $s_i$, and determine whether i is equal to $n_t$, if yes, transmit the OIS gain to the OIS motor controller 201; if no, add 1 to i and change the stroke of the lens again.

Specifically, at least two images are preset on the objective plane 103, each of the images is a solid point having at least two symmetry axes, and at least one pair of the symmetry axes form an included angle of 90 degrees; wherein, points meeting the above-mentioned conditions include circular points and square points. In the step S1, a centroid of an image is used as an objective position of the image, and the objective position is used as a reference position of the stroke. In FIG. 5, the three black solid points are three images.

The control module 101 is further configured to use a centroid of an image as an objective position of the image, and use the objective position as a reference position of the stroke.

Furthermore, the control parameters are recorded as v, $v = [v_1, \ldots, v_{n_j}]$, wherein $n_j$ is the number of the drivers; when the stroke is $s_i$, the relationship among the OIS gain, the compensation angles, and the control parameters are $v = K(\theta, s_i)$, wherein K is the OIS gain, and $\theta$ is the compensation angles; $\theta = [\theta_x, \theta_y]$, wherein $\theta_x$ is a compensation angle in the direction of $R_x$, and $\theta_y$ is a compensation angle in the direction of $R_y$.

If there are $n_q$ images on the objective plane 103, and in the photos obtained by the image sensor 204, the centroid of the $q^{th}$ image is $x_q = [x_q, y_q]$, $q \in [1, n_q] \in N$, wherein the measurement unit of $x_q$ and $y_q$ is pixel, and the average centroid is $\bar{x}_q = \Sigma x_q / n_q$, the control module 101 is further configured to: calculate the relationship between the image and the relative angle:

$$g = \frac{\Sigma \beta_q}{\Sigma \|\bar{x}_q - x_q\|},$$

and calculate the compensation angles $\theta$ according to the change $\Delta \bar{x}$ of $\bar{x}$: $\theta = g \Delta \bar{x}$; wherein $\beta_q$ is the relative angle.

Furthermore, the OIS camera module 2 further comprises an image sensor 204 configured to obtain photos via the lens, and the automatic tuning platform 1 is provided therein with an image format conversion module 102 configured to convert the format of the photos obtained by the image sensor 204 and transmit the converted photos to the control module 101, and a storage module 104 configured to store tuning parameters.

The control module 101 is further configured to read the tuning parameters stored in the storage module 104, and record the compensation angles, the relative angle, and the control parameters according to the photos in the converted format.

The tuning parameters include the waiting time t after every time the OIS motor 203 moves, the number $n_j$ of the drivers, the number $n_t$ of strokes during tuning, all the values $s_i$ of $i^{th}$ stroke during tuning, $i \in [1, n_t] \in N$, and the control parameters.

The control module 101 is further configured to store the OIS gains in the storage module 104.

The control parameters include, but are not limited to, the voltages or the current of the drivers.

In one specific embodiment, the objective plane 103 is vertical, and in the space coordinate system, the X-axis is horizontal and the Y-axis is vertical.

While the present application has been described with reference to the specific embodiments thereof, it will be apparent to one skilled in the art that various changes and equivalent substitutions of the present application may be made without departing from the scope of the present application. Furthermore, according to particular situations or material, modifications of the present application may be made without departing from the scope of the present application. Therefore, the present application is not limited to the disclosed specific embodiments, and should include all embodiments in the scope of the claims of the present application.

What is claimed is:

1. An automatic tuning method for OIS camera modules, wherein the method is used to tune an OIS camera module, the OIS camera module including an OIS motor controller and an OIS motor including a lens, and the OIS motor further includes a plurality of drivers; the method comprising:

S0: providing an automatic tuning platform, and providing an objective plane and a control module on the automatic tuning platform, wherein an image is preset on the objective plane; mounting the OIS camera module on the automatic tuning platform, and connecting the OIS motor controller with the control module; making an optical axis of the OIS camera module be perpendicular to the objective plane, and using an intersection of the objective plane and the optical axis as an origin to establish a space coordinate system, wherein the space coordinate system includes an X-axis and a Y-axis which are defined in the objective plane and are perpendicular to each other, and a Z-axis which is perpendicular to the objective plane;

S1: using the control module to instruct the OIS motor controller to control the OIS motor, and thereby changing a stroke of the lens, so that the stroke of the lens is a distance value between the lens and the image;

S2: using the control module to change control parameters of each driver or each pair of drivers in sequence, and thereby moving the lens; after every time the control parameters of one driver or a pair of drivers are changed, using the control module to record compensation angles, a relative angle, and the control parameters, wherein the relative angle is an included angle between a connecting line from the lens to the image and the Z-axis;

S3: calculating an OIS gain in the stroke according to the control parameters, the compensation angles, and the relative angle; and S4: transmitting the OIS gain to the OIS motor controller.

2. The automatic tuning method for OIS camera modules according to claim 1, wherein S1 further includes:

S101: using the control module to preset a number $n_i$ of the times for changing the stroke, and using the OIS motor controller to preset i=1; and S102: using the control module to instruct the OIS motor controller to control the OIS motor, and thereby changing the stroke of the lens; at this time, the stroke is $s_i$;

and wherein S3 further includes:

S301: using the control module to calculate an OIS gain in the stroke $s_i$ according to the control parameters, the compensation angles, and the relative angle; and S302: determining whether i is equal to $n_i$; if yes, performing the step S4; if no, adding 1 to i, and returning to S102.

3. The automatic tuning method for OIS camera modules according to claim 2, wherein in S0, at least two images are preset on the objective plane; and in S1, a centroid of an image is used as an objective position of the image, and the objective position is used as a reference position of the stroke.

4. The automatic tuning method for OIS camera modules according to claim 1, wherein the control parameters are recorded as v, $v=[v_1, \ldots, v_{n_j}]$, wherein $n_j$ is a number of the drivers; when the stroke is $s_i$, a relationship among the OIS gain, the compensation angles, and the control parameters is $v=K(\theta, s_i)$, wherein K is the OIS gain, and $\theta$ is the compensation angles; $\theta=[\theta_x, \theta_y]$, wherein $\theta_x$ is a compensation angle in a direction of $R_x$, and $\theta_y$ is a compensation angle in a direction of $R_y$.

5. The automatic tuning method for OIS camera modules according to claim 1, wherein if there are $n_q$ images on the objective plane having an index q, and in photos obtained by an image sensor, a centroid of the $q^{th}$ image is $x_q=[x_q, y_q]$, $q\epsilon[1, n_q]\epsilon N$, wherein a measurement unit of $x_q$ and $y_q$ is pixel, and an average centroid is $\bar{x}_q=\Sigma x_q/n_q$, S3 further comprises: calculating a relationship between the image and the relative angle:

$$g = \frac{\Sigma \beta_q}{\Sigma \|\bar{x}_q - x_q\|},$$

wherein βq is the relative angle; and calculating the compensation angles θ according to a change $\Delta \bar{x}$ of $\bar{x}$: $\theta = g \Delta \bar{x}$.

6. The automatic tuning method for OIS camera modules according to claim 1, wherein S0 further comprises providing a storage module in the automatic tuning platform; and in S0 the control module reads tuning parameters stored in the storage module.

7. The automatic tuning method for OIS camera modules according to claim 6, wherein, the tuning parameters include a waiting time t after every time the OIS motor moves, a number $n_j$ of the drivers, a number $n_i$ of strokes during tuning, all the values $s_i$ of the $i^{th}$ stroke during tuning, $i\epsilon[1, n_i]\epsilon N$, and the control parameters.

8. The automatic tuning method for OIS camera modules according to the claim 6, wherein S4 further comprises storing the OIS gain in the storage module.

9. The automatic tuning method for OIS camera modules according to claim 1, wherein the control parameters include voltages or current of the drivers.

10. The automatic tuning method for OIS camera modules according to claim 1, wherein in S0, the objective plane is vertical, and in the space coordinate system, the X-axis is horizontal and the Y-axis is vertical.

11. An automatic tuning system for OIS camera modules; wherein, the system is used to tune an OIS camera module, the OIS camera module includes an OIS motor controller and an OIS motor including a lens, and the OIS motor further includes a plurality of drivers; the system comprising:

an automatic tuning platform, an objective plane, and a control module provided on the automatic tuning platform, and an image preset on the objective plane; the OIS camera module is mounted on the automatic tuning platform, and the OIS motor controller is connected with the control module; an optical axis of the OIS camera module is perpendicular to the objective plane, and the automatic tuning platform uses an intersection of the objective plane and the optical axis as an origin to establish a space coordinate system; the space coordinate system includes an X-axis and a Y-axis which are defined in the objective plane and perpendicular to each other, and a Z-axis which is perpendicular to the objective plane;

the control module instructs the OIS motor controller to control the OIS motor and thereby change a stroke of the lens, and the stroke is a distance value between the lens and the image;

the control module changes control parameters of each driver or each pair of drivers in sequence and thereby moves the lens; records a compensation angle, a relative angle, and the control parameters after every time the control parameter of one driver or a pair of drivers are changed; calculates an OIS gain in the stroke according to the recorded control parameters, compensation angles, and relative angle; and transmits the OIS gain to the OIS motor controller; wherein, the relative angle is an included angle between a connecting line from the lens to the image and the Z-axis.

12. The automatic tuning system for OIS camera modules according to claim 11, wherein the OIS motor controller presets i=1; the control module presets a number $n_t$ of the times for changing the stroke, and instructs the OIS motor controller to control the OIS motor and thereby change the stroke of the lens, wherein the stroke is $s_i$;

the control module calculates an OIS gain in the stroke $s_i$, and determines whether i is equal to $n_t$, if yes, transmits the OIS gain to the OIS motor controller; if no, adds 1 to i and changes the stroke of the lens again.

13. The automatic tuning system for OIS camera modules according to claim 12, wherein at least two images are preset on the objective plane;

the control module uses a centroid of an image as an objective position of the image, and uses the objective position as a reference position of a stroke.

14. The automatic tuning system for OIS camera modules according to claim 11, wherein the control parameters are recorded as v, $v=[v_1, \ldots, v_{n_j}]$, wherein $n_j$ is a number of the drivers; when the stroke is $s_i$, a relationship among the OIS gain, the compensation angles, and the control parameters is $v=K(\theta, s_i)$, wherein K is the OIS gain, and $\theta$ is the compensation angles; $\theta=[\theta_x, \theta_y]$, wherein $\theta_x$ is a compensation angle in a direction of $R_x$, and $\theta_y$ is a compensation angle in a direction of $R_y$.

15. The automatic tuning system for OIS camera modules according to claim 11, wherein if there are $n_q$ images on the objective plane having an index q, and in the photos obtained by an image sensor (204), the centroid of the $q^{th}$ image is $x_q=[x_q, y_q]$, $q\in[1, n_q]\in N$, wherein the measurement unit of $x_q$ and $y_q$ is pixel, and the average centroid is $\bar{x}_q=\Sigma x_q/n_q$, the control module calculates a relationship between the image and the relative angle:

$$g = \frac{\Sigma \beta_q}{\Sigma \|\bar{x}_q - x_q\|},$$

and calculates the compensation angles $\theta$ according to a change $\Delta \bar{x}$ of $\bar{x}$: $\theta=g\Delta\bar{x}$; wherein $\beta q$ is the relative angle.

16. The automatic tuning system for OIS camera modules according to claim 11, wherein the OIS camera module further comprises an image sensor that obtains photos via the lens, and the automatic tuning platform is provided therein with an image format conversion module that converts the format of the photos obtained by the image sensor and transmits the converted photos to the control module, and a storage module that stores tuning parameters;

the control module reads the tuning parameters stored in the storage module, and records the compensation angles, the relative angle, and the control parameters according to the photos in the converted format.

17. The automatic tuning system for OIS camera modules according to claim 16, wherein the tuning parameters include a waiting time t after every time the OIS motor moves, a number $n_j$ of the drivers, a number $n_t$ of strokes during tuning, all the values $s_i$ of the $i^{th}$ stroke during tuning, $i\in[1, n_t]\in N$, and the control parameters.

18. The automatic tuning system for OIS camera modules according to claim 16, wherein the control module stores the OIS gain in the storage module.

19. The automatic tuning system for OIS camera modules according to claim 11, wherein the control parameters include voltages or current of the drivers.

20. The automatic tuning system for OIS camera modules according to claim 11, wherein the objective plane is vertical, and in the space coordinate system, the X-axis is horizontal and the Y-axis is vertical.

* * * * *